United States Patent
Wu

(10) Patent No.: US 10,639,788 B2
(45) Date of Patent: May 5, 2020

(54) PARALLEL LINK ROBOT

(71) Applicant: Fanuc Corporation, Yamanashi (JP)

(72) Inventor: Yunfeng Wu, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/235,353

(22) Filed: Dec. 28, 2018

(65) Prior Publication Data

US 2019/0210220 A1    Jul. 11, 2019

(30) Foreign Application Priority Data

Jan. 9, 2018 (JP) .................................. 2018-001060

(51) Int. Cl.
| | |
|---|---|
| *B25J 9/10* | (2006.01) |
| *B25J 9/00* | (2006.01) |
| *B25J 9/16* | (2006.01) |
| *B25J 17/02* | (2006.01) |
| *B25J 19/00* | (2006.01) |
| *B25J 18/00* | (2006.01) |

(52) U.S. Cl.
CPC .......... *B25J 9/1065* (2013.01); *B25J 9/0051* (2013.01); *B25J 9/1623* (2013.01); *B25J 17/0266* (2013.01); *B25J 17/0275* (2013.01); *B25J 19/0066* (2013.01); *B25J 18/00* (2013.01)

(58) Field of Classification Search
CPC ...... B25J 9/1065; B25J 9/0051; B25J 9/1623; B25J 17/0266; B25J 17/0275; B25J 19/0066
See application file for complete search history.

(56) References Cited

U.S. PATENT DOCUMENTS

| | | | | | |
|---|---|---|---|---|---|
| 4,786,847 | A | * | 11/1988 | Daggett | ................. B25J 9/1633 318/568.2 |
| 5,083,070 | A | * | 1/1992 | Poupard | ........... G05B 19/41815 318/561 |
| 7,822,466 | B2 | * | 10/2010 | Stoianovici | ............ A61B 34/30 600/229 |
| 2011/0097184 | A1 | | 4/2011 | Kinoshita et al. | |

(Continued)

FOREIGN PATENT DOCUMENTS

| | | |
|---|---|---|
| JP | S59-219195 A | 12/1984 |
| JP | H02-284898 A | 11/1990 |

(Continued)

OTHER PUBLICATIONS

Ishikawa, Kaoru; Notice of Reasons for Refusal for Japanese Patent Application No. 2018-001060; dated Dec. 10, 2019; 2 pages.

(Continued)

*Primary Examiner* — David M Fenstermacher
(74) *Attorney, Agent, or Firm* — Winstead PC

(57) ABSTRACT

A parallel link robot includes a base portion; a movable portion that is disposed below the base portion; a plurality of arms that link the base portion and the movable portion so as to be parallel to each other; and a wrist shaft that is supported by the movable portion so as to be rotatable about a rotation axis in a substantially vertical direction. A pair of marks indicate a relative phase between the movable portion and the wrist shaft about the rotation axis are on the movable portion and the wrist shaft, at positions visible from the upper side or the lateral side.

3 Claims, 7 Drawing Sheets

(56) References Cited

U.S. PATENT DOCUMENTS

| | | | |
|---|---|---|---|
| 2011/0295421 A1* | 12/2011 | Ban | B25J 9/101 |
| | | | 700/245 |
| 2012/0266713 A1 | 10/2012 | Feng | |
| 2014/0060234 A1 | 3/2014 | Uemura | |

FOREIGN PATENT DOCUMENTS

| | | |
|---|---|---|
| JP | H08-276390 A | 10/1996 |
| JP | H08-281582 A | 10/1996 |
| JP | 2009-255193 A | 11/2009 |
| JP | 2011-088262 A | 5/2011 |
| JP | 2014-046434 A | 3/2014 |
| JP | 2015-085486 A | 5/2015 |
| JP | 2016-048093 A | 4/2016 |

OTHER PUBLICATIONS

Industrial Property Cooperation Center; Search Report by Registered Search Organization; Japanese Patent Application No. 2018-001060; dated Dec. 6, 2019; 10 pages.

\* cited by examiner

PARALLEL LINK ROBOT

CROSS-REFERENCE TO RELATED APPLICATIONS

This application is based on Japanese Patent Application No. 2018-001060, the contents of which are incorporated herein by reference.

TECHNICAL FIELD

The present invention relates to a parallel link robot.

BACKGROUND ART

In the related art, there is a known parallel link robot provided with: a base portion on which three motors are disposed; a movable portion disposed below the base portion; and three arms that link the base portion and the movable portion so as to be parallel to each other and that are driven by the motors (for example, see Japanese Unexamined Patent Application, Publication No. 2015-85486 and Japanese Unexamined Patent Application, Publication No. 2009-255193). The movable portion is provided with a wrist shaft that is rotatable about a vertical axis with respect to the movable portion. An end effector, such as a hand, can be attached to a wrist flange at the lower end of the wrist shaft, and it is possible to change the orientation of the end effector about the vertical axis by means of rotation of the wrist shaft with respect to the movable portion.

Meanwhile, in order to perform phase-matching between a rotating member and a rotating shaft of the rotating member in a simple manner, marks such as marking-off lines, which are individually provided in advance on the rotating member and the rotating shaft, are used (for example, see Japanese Unexamined Patent Application, Publication No. 2016-048093).

SUMMARY OF INVENTION

An aspect of the present invention is a parallel link robot provided with: a base portion; a movable portion that is disposed below the base portion; a plurality of arms that link the base portion and the movable portion so as to be parallel to each other; and a wrist shaft that is supported by the movable portion so as to be rotatable about a rotation axis in a substantially vertical direction, wherein a pair of marks that indicate a relative phase between the movable portion and the wrist shaft about the rotation axis are provided on the movable portion and the wrist shaft, at positions visible from the upper side or the lateral side.

In the abovementioned aspect, the movable portion may have a through-hole that allows the wrist shaft to penetrate therethrough in a substantially vertical direction, one of the marks may be provided on an upper end surface of the movable portion, and the other one of the marks may be provided on an outer circumferential surface or an upper end surface of the wrist shaft protruding from an upper end of the through-hole.

In the abovementioned aspect, a drive shaft that is disposed between the base portion and the movable portion in a vertical direction and that rotationally drives the wrist shaft about the rotation axis by means of rotation about a longitudinal axis may be provided, the movable portion may be provided with a shaft casing that supports a lower end portion of the drive shaft so as to be rotatable about the longitudinal axis, one of the marks may be provided on an upper end surface of the shaft casing, and the other one of the marks may be provided on an outer circumferential surface of the drive shaft.

DESCRIPTION OF EMBODIMENT

A parallel link robot 1 according to an embodiment of the present invention will be described below with reference to the drawings.

Figure 1:
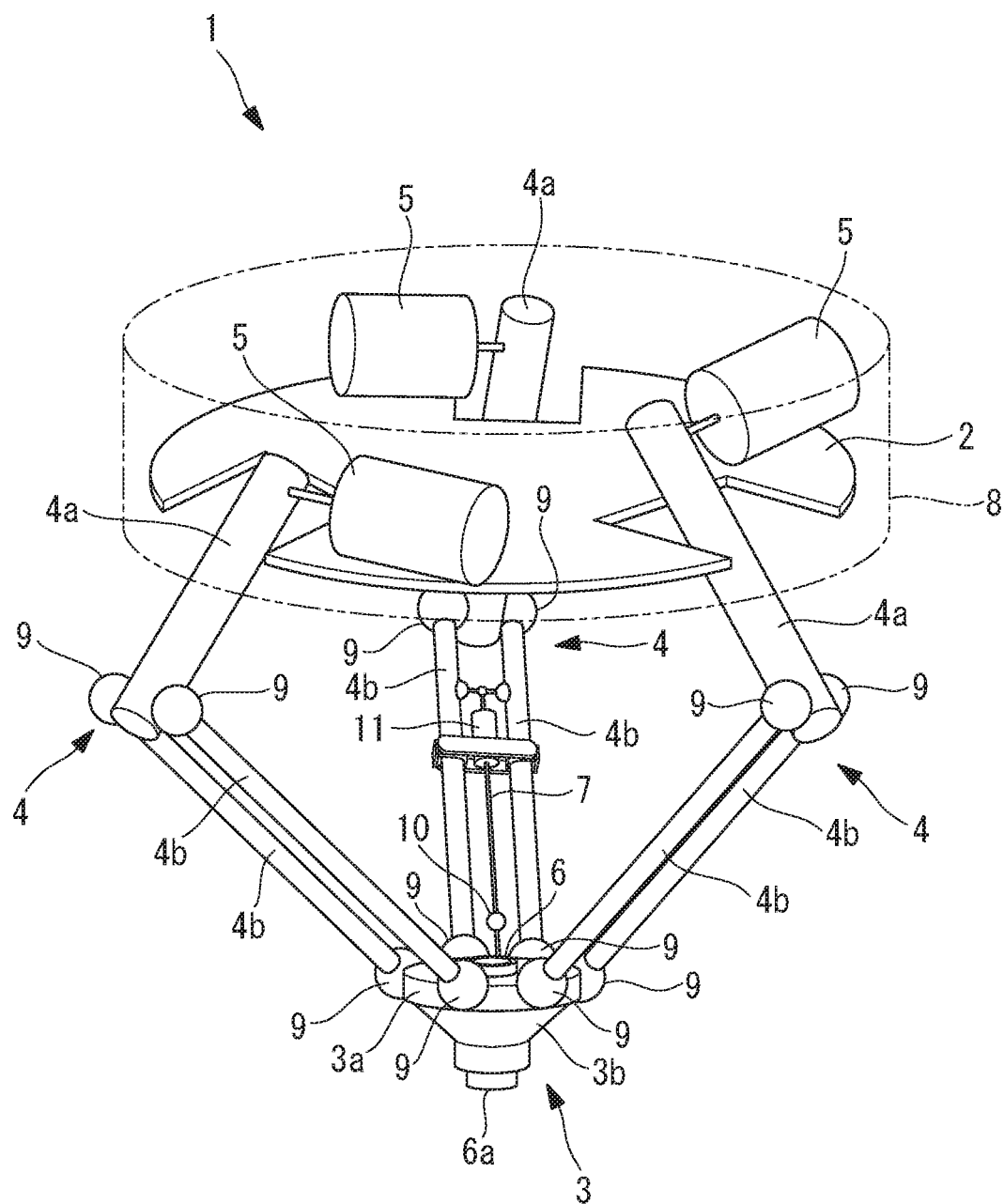
FIG. 1 is a perspective view showing a parallel link robot according to an embodiment of the present invention.

As shown in FIG. 1, the parallel link robot 1 according to this embodiment is provided with: a base portion 2 that is accommodated in a housing 8; a movable portion 3 that is disposed below the base portion 2; three arms 4 that link the base portion 2 and the movable portion 3 so as to be parallel to each other; three actuators 5 that are disposed on the base portion 2 and that respectively drive the three arms 4; a wrist shaft 6 that is supported by the movable portion 3 so as to be rotatable about a rotation axis A in a substantially vertical direction; and a drive shaft 7 that rotationally drives the wrist shaft 6.

The base portion 2 is formed of a plate-shaped member that is substantially horizontally disposed, and the three actuators 5 are disposed on the base portion 2.

The three arms 4 are disposed at equal intervals in a circumferential direction about a vertical axis at the center of the base portion 2. Each of the arms 4 is provided with a driving link 4a and a pair of passive links 4b that are parallel to each other. An upper end portion of the driving link 4a is connected with the actuator 5. Individual upper end portions of the pair of passive links 4b and a lower end portion of the driving link 4a are pivotably connected by means of ball joints 9, and individual lower end portions of the pair of passive links 4b and the movable portion 3 are pivotably connected by means of the ball joints 9.

The actuators 5 each have a servomotor and a reduction gear and respectively make the driving links 4a pivot about a horizontal axis. The three actuators 5 make the three driving links 4a pivot so that the movable portion 3 is translated while the orientation of the movable portion 3 with respect to the base portion 2 is kept constant.

The drive shaft 7 is disposed between the pair of passive links 4b and extends in the vertical direction in parallel with the passive links 4b. A universal joint 10 is provided at an intermediate position in the longitudinal direction of the drive shaft 7. The drive shaft 7 is rotated about a longitudinal axis B thereof by means of a driving force generated by a wrist actuator 11 fixed to the arm 4.

The movable portion 3 is provided with: an annular movable plate 3a that is substantially horizontally disposed; a tubular wrist casing 3b that is fixed on the inner side of the movable plate 3a so as to support the wrist shaft 6; and a shaft casing 3c that is formed integrally with the wrist casing 3b so as to support a lower end portion of the drive shaft 7.

The wrist casing 3b has a through-hole that penetrates therethrough in a substantially vertical direction. The wrist shaft 6 penetrates through the through-hole in a substantially vertical direction, and an upper end portion and a lower end portion of the wrist shaft 6 respectively protrude from an upper end surface and a lower end surface of the wrist casing 3b. A wrist flange 6a to which an end effector (not shown), such as a hand, is attached in a prescribed orientation is provided at the lower end portion of the wrist shaft 6. The wrist casing 3b supports, via a bearing (not shown), the wrist shaft 6 so as to be rotatable about the rotation axis A, which is a central axis of the wrist shaft 6.

The shaft casing 3c supports, via a bearing (not shown), the lower end portion of the drive shaft 7 so as to be rotatable about the longitudinal axis B. A gear (not shown) that transmits the rotation of the lower end portion of the drive shaft 7 to the wrist shaft 6 to rotate the wrist shaft 6 is disposed in the interior of the movable portion 3. The rotation of the drive shaft 7 causes the wrist shaft 6 to rotate about the rotation axis A with respect to the movable portion 3, thereby changing the orientation, about the rotation axis A, of the wrist flange 6a and the end effector attached to the wrist flange 6a.

Figure 2:
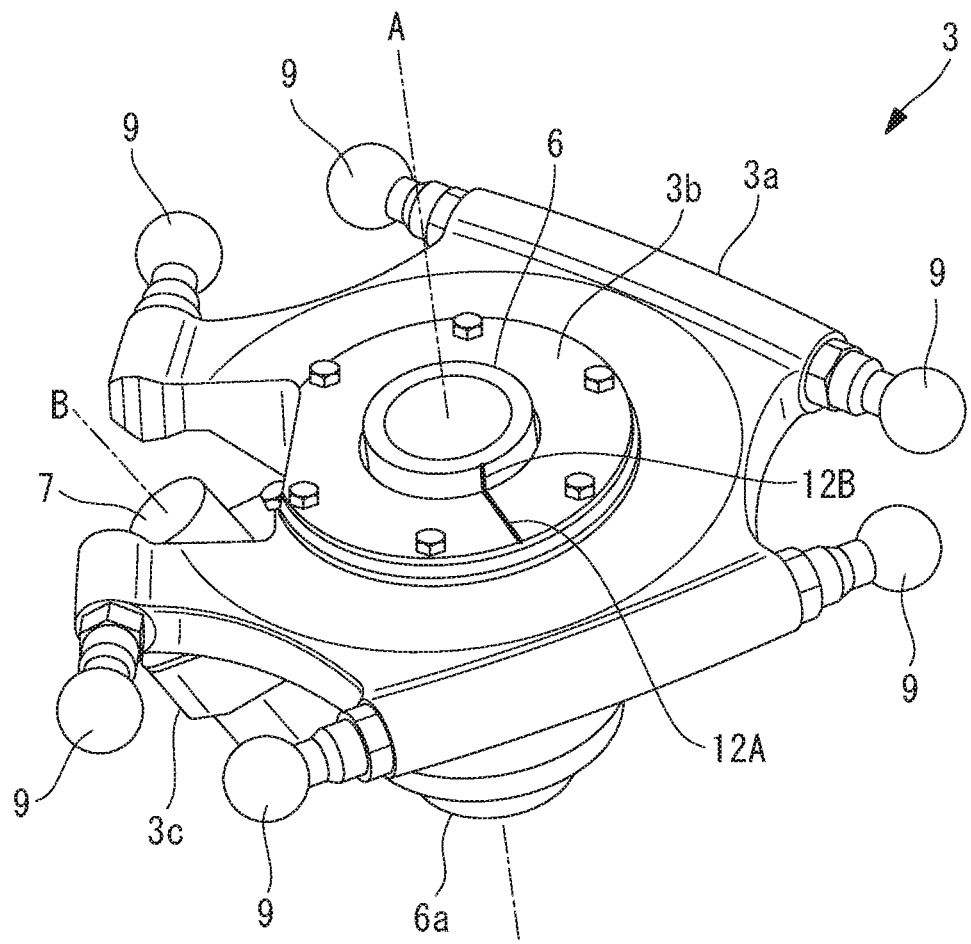
FIG. 2 is a perspective view of a movable portion and a wrist shaft in the parallel link robot in FIG. 1, as viewed obliquely from above.
Figure 3:
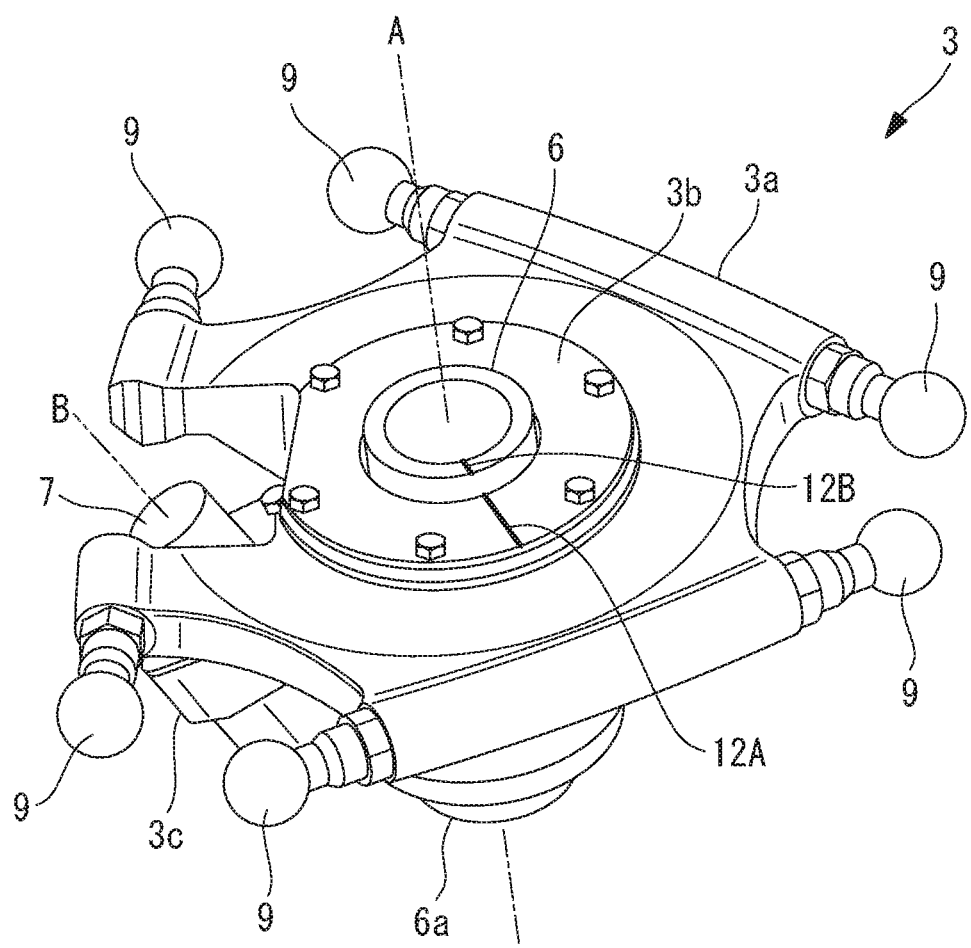
FIG. 3 is a diagram showing a modification of positions of a pair of marks and is a perspective view of the movable portion and the wrist shaft, as viewed obliquely from above.

As shown in FIGS. 2 and 3, a pair of marks 12A, 12B that indicate a phase (rotation angle) of the wrist shaft 6, about the rotation axis A, relative to the movable portion 3 are provided on the movable portion 3 and the wrist shaft 6. The marks 12A, 12B are, for example, marking-off lines that are formed on the surfaces of the wrist shaft 6 and the wrist casing 3b or stickers that are stuck on the surfaces of the wrist shaft 6 and the wrist casing 3b.

The marks 12A, 12B are provided on the movable portion 3 and the wrist shaft 6, at positions visible from the upper side or the lateral side. Specifically, in an example in FIG. 2, one mark 12A is provided on the upper end surface of the wrist casing 3b and the other mark 12B is provided on an outer circumferential surface of the upper end portion of the wrist shaft 6 protruding from the upper end surface of the wrist casing 3b. In an example in FIG. 3, one mark 12A is provided on the upper end surface of the wrist casing 3b and the other mark 12B is provided on an upper end surface of the wrist shaft 6. The other mark 12B may be provided on both the outer circumferential surface and the upper end surface of the wrist shaft 6.

The pair of marks 12A, 12B are individually provided at one location in the circumferential direction about the rotation axis A in such a manner that the marks 12A, 12B are adjacent to each other, being aligned in a row in a direction orthogonal to the rotation axis A, when the phase of the wrist shaft 6, about the rotation axis A, relative to the movable portion 3 is a prescribed phase (for example, 0 degrees). Therefore, a worker can recognize the phase of the wrist shaft 6, about the rotation axis A, relative to the movable portion 3 on the basis of the positional relationship between the mark 12A and the mark 12B in the circumferential direction about the rotation axis A.

Next, relative phase-matching between the movable portion 3 and the wrist shaft 6, which is performed on the basis of the pair of marks 12A, 12B, will be described.

For example, after a motor of the actuator 11 is replaced with another motor, the relationship between the rotation angle of the other motor and the phase of the wrist shaft 6 relative to the movable portion 3 may change; thus, work for restoring the relationship between the rotation angle of the motor before the motor replacement and the phase of the wrist shaft 6 is performed. In the restoration work, a worker makes the wrist shaft 6 rotate about the rotation axis A with respect to the movable portion 3, and performs phase-matching of the wrist shaft 6 relative to the movable portion 3 so that the pair of marks 12A, 12B are adjacent to each other. Next, for a control device (not shown) that controls the parallel link robot 1, the worker sets the phase of the wrist shaft 6 after the phase-matching as a prescribed phase (for example, 0 degrees). By doing so, the control device can control the actuator 11 by using an operation program which has been used before the motor replacement without any change.

Figure 6:
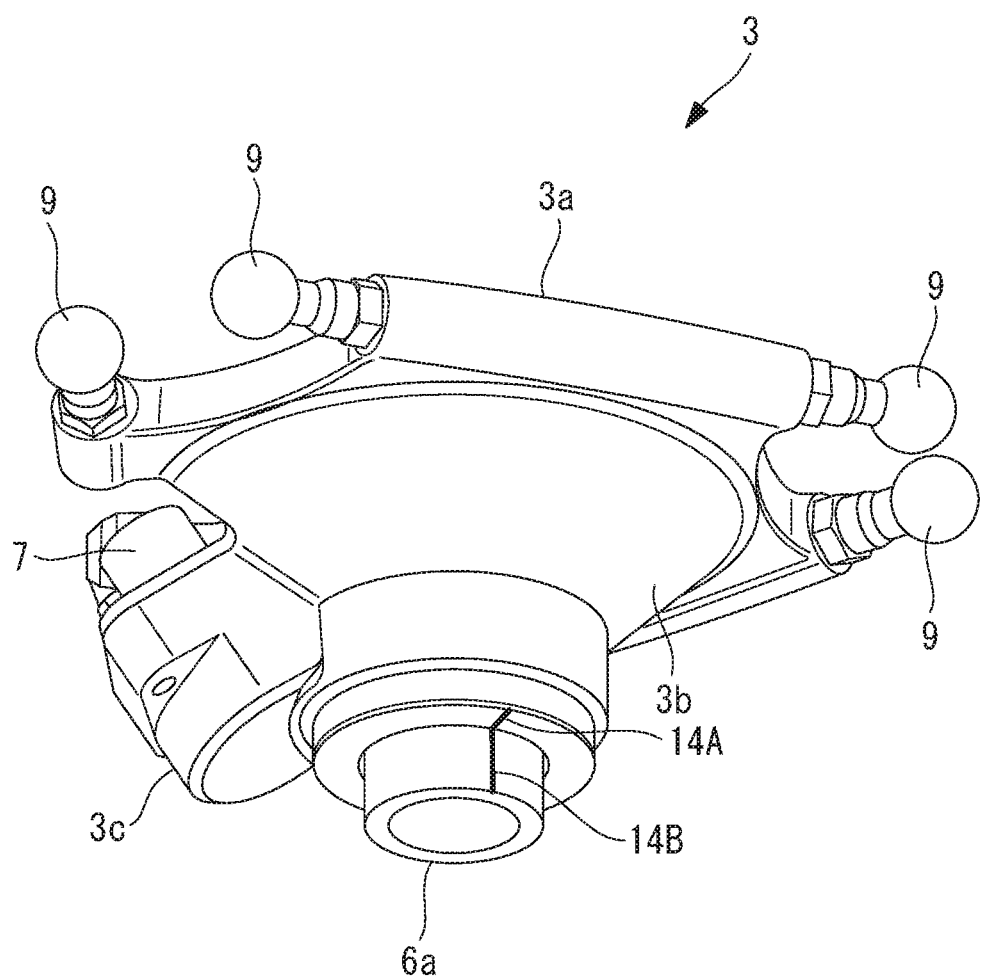
FIG. 6 is a diagram showing a conventional example of the positions of the pair of marks and is a perspective view of the movable portion and the wrist shaft, as viewed obliquely from below.
Figure 7:
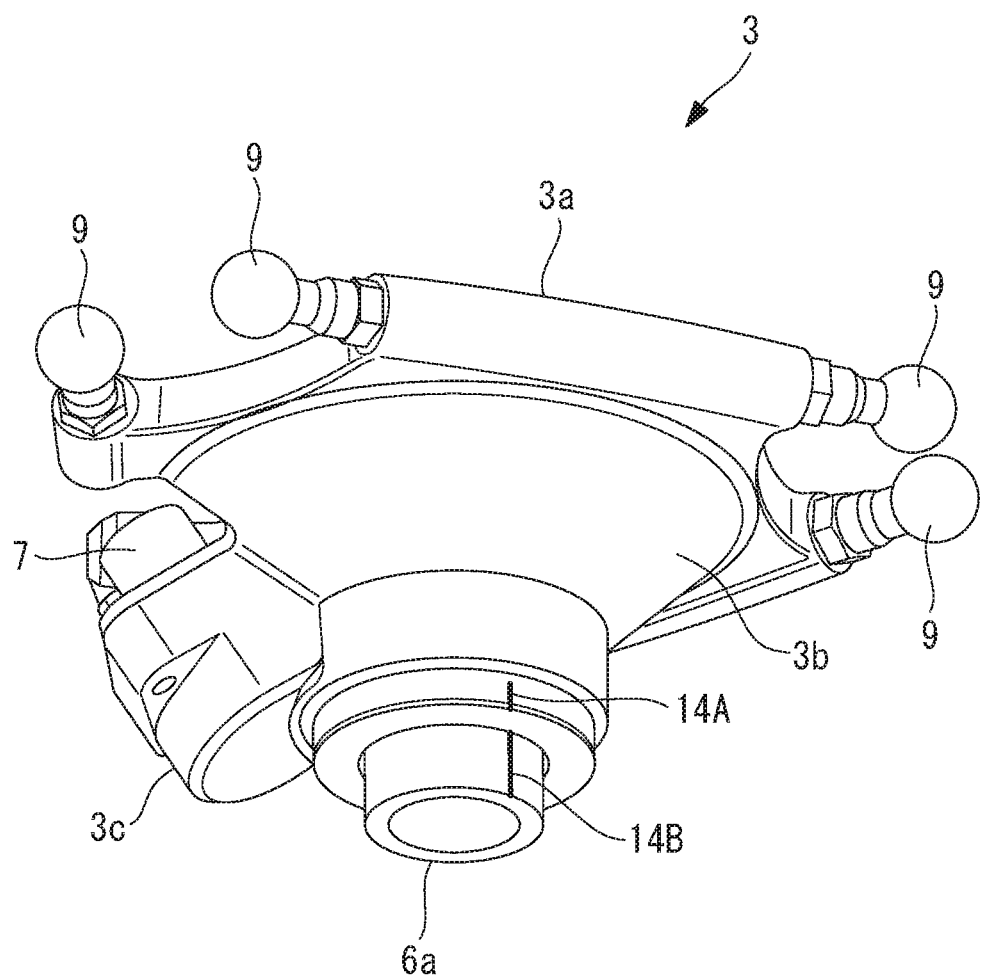
FIG. 7 is a diagram showing another conventional example of the positions of the pair of marks and is a perspective view of the movable portion and the wrist shaft, as viewed obliquely from below.

In this case, the parallel link robot 1 is often disposed in a space surrounded by walls or the like or disposed directly above a conveyor, and furthermore, the wrist flange 6a always faces downward. Therefore, as shown in FIGS. 6 and 7, in a case in which marks 14A, 14B are provided on the lower end portion of the wrist shaft 6 and the lower end surface of the wrist casing 3b, the worker has to perform the phase-matching for the wrist shaft 6 in a restricted working space while looking up at the movable portion 3 and the wrist shaft 6 from below. It is hard to perform such work, and the work efficiency is poor. Because of this, there is a problem in that the work time increases. Furthermore, when the marks 14A, 14B are hidden by the end effector attached to the wrist flange 6a, the worker has to detach the end effector from the wrist flange 6a, which increases the work man-hours and the work time.

With this embodiment, because the marks 12A, 12B are provided on the movable portion 3 and the wrist shaft 6, at the positions visible from the upper side or the lateral side, the worker can easily perform the phase-matching for the wrist shaft 6. Because the marks 12A, 12B are not hidden by the end effector, it is possible to perform the phase-matching in the state in which the end effector is attached to the wrist flange 6a. By doing so, there is an advantage in that it is possible to reduce the work time for the phase-matching.

Figure 4:
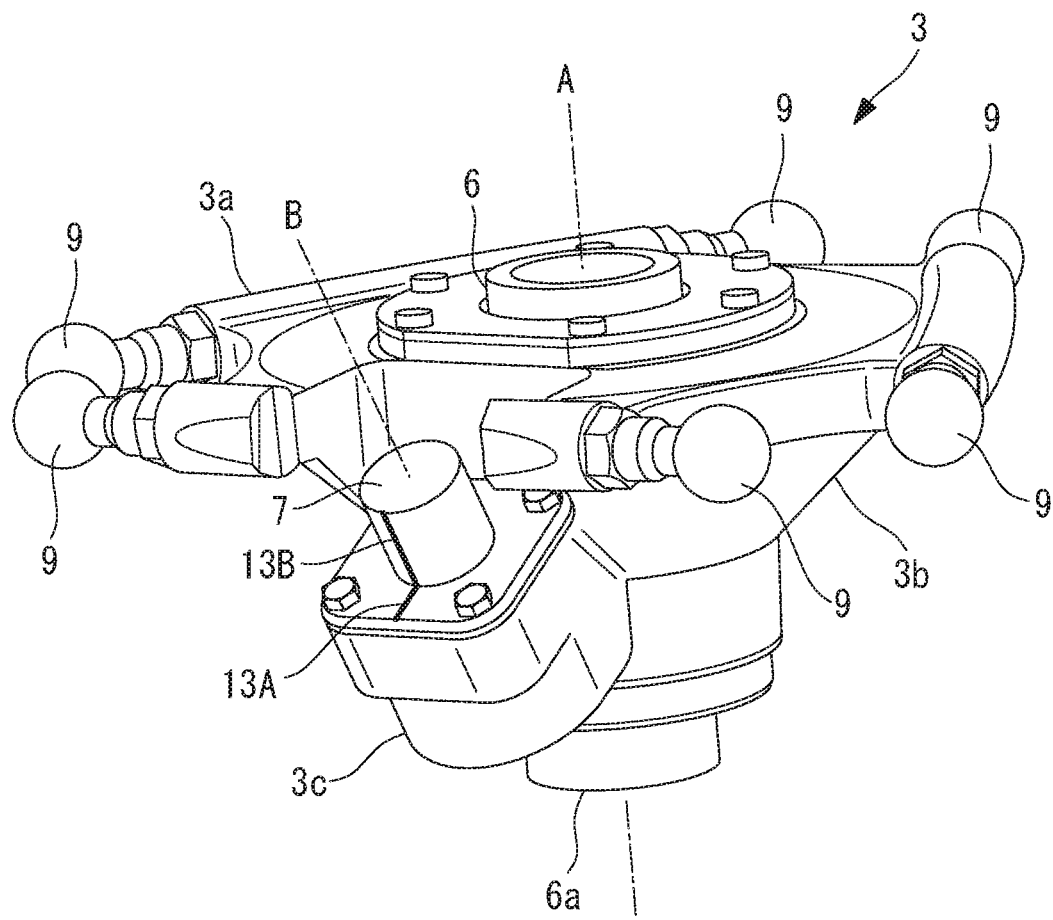
FIG. 4 is a diagram showing another modification of the positions of the pair of marks and is a perspective view of the movable portion and a drive shaft, as viewed obliquely from above.

Although the pair of marks 12A, 12B are provided on the wrist shaft 6 and the wrist casing 3b in this embodiment, alternatively or additionally, as shown in FIG. 4, a pair of marks 13A, 13B may be provided on the drive shaft 7 and the shaft casing 3c.

Specifically, in an example in FIG. 4, one mark 13A is provided on an upper end surface of the shaft casing 3c and the other mark 13B is provided on an outer circumferential surface of the drive shaft 7 located outside the shaft casing 3c.

The wrist shaft 6 is rotated about the rotation axis A in synchronization with the rotation of the drive shaft 7 about the longitudinal axis B. Therefore, it is also possible to perform the phase-matching of the wrist shaft 6 relative to the movable portion 3 by performing phase-matching of the drive shaft 7 relative to the shaft casing 3c.

Because the drive shaft 7 is rotated multiple times with respect to one rotation of the wrist shaft 6, compared to the marks 12A, 12B in FIGS. 2 and 3, it is possible to perform the phase-matching of the wrist shaft 6 relative to the movable portion 3 with higher precision on the basis of the marks 13A, 13B. Therefore, in a case in which the marks 12A, 12B and the marks 13A, 13B are both provided, rough phase-matching of the wrist shaft 6 may be performed on the basis of the marks 12A, 12B, and subsequently, precise phase-matching of the wrist shaft 6 may be performed on the basis of the marks 13A, 13B.

Figure 5:
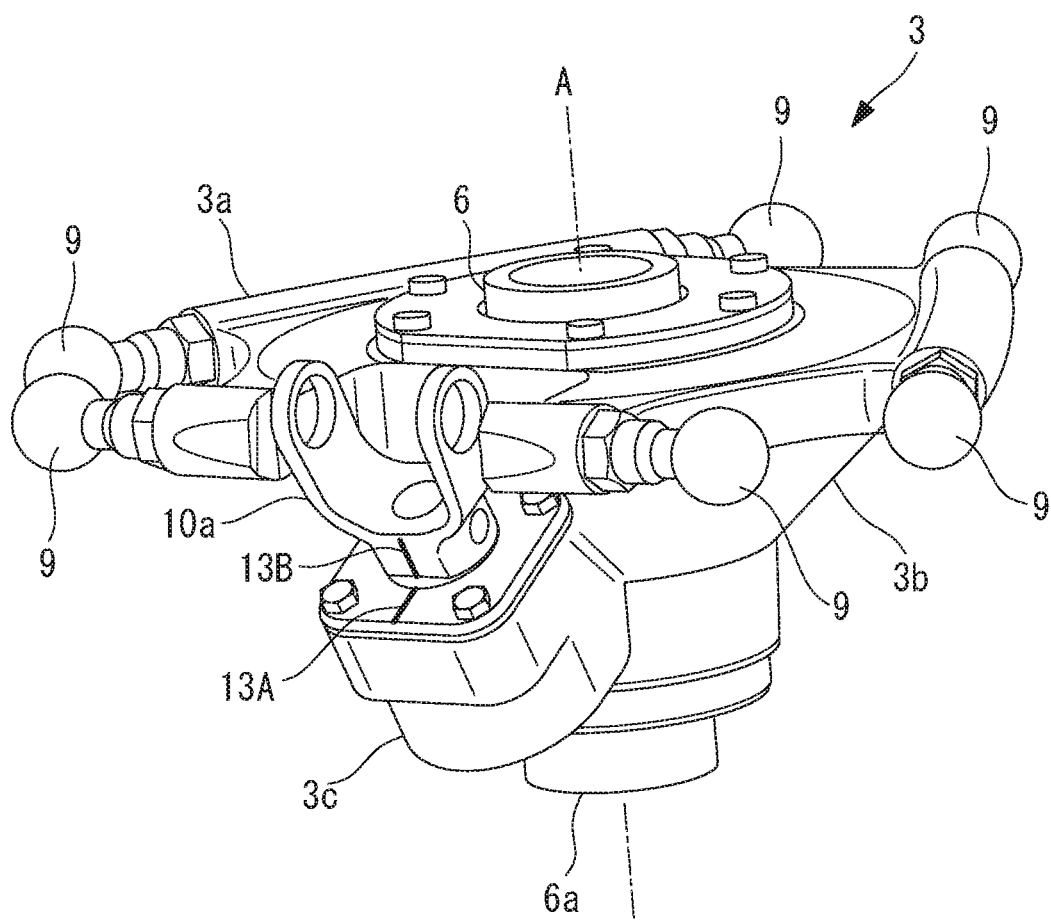
FIG. 5 is a diagram showing another modification of the positions of the pair of marks and is a perspective view of the movable portion and the drive shaft, as viewed obliquely from above.

As shown in FIG. 5, in a case in which the universal joint 10 of the drive shaft 7 is located in the vicinity of the upper end surface of the shaft casing 3c, the mark 13B may be provided on a component 10a, among components of the universal joint 10, which is fixed to the lower end portion of the shaft body of the drive shaft 7 that is supported by the shaft casing 3c, instead of on the outer circumferential surface of the shaft body.

As a result, the following aspect is derived from the above described embodiment.

An aspect of the present invention is a parallel link robot provided with: a base portion; a movable portion that is disposed below the base portion; a plurality of arms that link the base portion and the movable portion so as to be parallel to each other; and a wrist shaft that is supported by the movable portion so as to be rotatable about a rotation axis in a substantially vertical direction, wherein a pair of marks that indicate a relative phase between the movable portion and the wrist shaft about the rotation axis are provided on the movable portion and the wrist shaft, at positions visible from the upper side or the lateral side.

With this aspect, by rotating the wrist shaft about the rotation axis with respect to the movable portion so that the pair of marks have a prescribed positional relationship, it is possible to match the relative phase between the movable portion and the wrist shaft with a prescribed phase.

In this case, the pair of marks are provided on the movable portion and the wrist shaft, at the positions visible from the upper side or the lateral side. Therefore, a worker can easily recognize the marks in a normal state in which a wrist flange at the lower end of the wrist shaft faces downward. Because the marks provided at such positions are not hidden by an end effector that is attached to the wrist flange, it is possible to perform phase-matching between the movable portion and the wrist shaft in the state in which the end effector is attached to the wrist flange.

In the abovementioned aspect, the movable portion may have a through-hole that allows the wrist shaft to penetrate therethrough in a substantially vertical direction, one of the marks may be provided on an upper end surface of the movable portion, and the other one of the marks may be provided on an outer circumferential surface or an upper end surface of the wrist shaft protruding from an upper end of the through-hole.

As described above, in the case in which an upper end portion of the wrist shaft protrudes upward from the movable portion, it is possible to directly provide the mark on the wrist shaft.

In the abovementioned aspect, a drive shaft that is disposed between the base portion and the movable portion in a vertical direction and that rotationally drives the wrist shaft about the rotation axis by means of rotation about a longitudinal axis may be provided, the movable portion may be provided with a shaft casing that supports a lower end portion of the drive shaft so as to be rotatable about the longitudinal axis, one of the marks may be provided on an upper end surface of the shaft casing, and the other one of the marks may be provided on an outer circumferential surface of the drive shaft.

In the case in which the drive shaft is provided, because the wrist shaft is rotated in synchronization with the rotation of the drive shaft, it is possible to perform relative phase-matching between the wrist shaft and the movable portion on the basis of the positional relationship between the mark on the drive shaft and the mark on the shaft casing of the movable portion.

REFERENCE SIGNS LIST 1 parallel link robot
2 base portion
3 movable portion
3a movable plate
3b wrist casing
3c shaft casing
4 arm
4a driving link
4b passive link
5 actuator
6 wrist shaft
6a wrist flange
7 drive shaft
9 ball joint
10 universal joint
11 wrist actuator
12A, 12B, 13A, 13B mark
A rotation axis
B longitudinal axis

The invention claimed is:

1. A parallel link robot comprising:
a base portion;
a movable portion disposed below the base portion;
a plurality of arms disposed at intervals in a circumferential direction about a centered vertical axis of the base portion and that link the base portion and the movable portion so as to be parallel to each other;
a wrist shaft that is supported by the movable portion so as to be rotatable about a rotation axis in a substantially vertical direction; and
wherein a pair of marks that indicate a relative phase between the movable portion and the wrist shaft about the rotation axis are provided on the movable portion and the wrist shaft, at positions visible from the upper side or the lateral side.

2. The parallel link robot according to claim 1, wherein:
the movable portion has a through-hole that allows the wrist shaft to penetrate therethrough in a substantially vertical direction;
one of the marks is provided on an upper end surface of the movable portion; and
the other one of the marks is provided on an outer circumferential surface or an upper end surface of the wrist shaft protruding from an upper end of the through-hole.

3. A parallel link robot comprising:
a base portion;
a movable portion disposed below the base portion;
a plurality of arms that link the base portion and the movable portion so as to be parallel to each other;
a wrist shaft that is supported by the movable portion so as to be rotatable about a rotation axis in a substantially vertical direction;
a drive shaft that is disposed between the base portion and the movable portion in a vertical direction and that rotationally drives the wrist shaft about the rotation axis via rotation about a longitudinal axis;

wherein a pair of marks that indicate a relative phase between the movable portion and the wrist shaft about the rotation axis are provided on the movable portion and the wrist shaft, at positions visible from the upper side or the lateral side; and
wherein the movable portion is provided with a shaft casing that supports a lower end portion of the drive shaft so as to be rotatable about the longitudinal axis;
wherein one of the marks is provided on an upper end surface of the shaft casing; and
wherein the other one of the marks is provided on an outer circumferential surface of the drive shaft.

* * * * *